(12) United States Patent
Nigram et al.

(10) Patent No.: US 10,225,248 B2
(45) Date of Patent: *Mar. 5, 2019

(54) METHODS AND SYSTEMS FOR PROVIDING ONLINE VERIFICATION AND SECURITY

(71) Applicant: Optimum ID LLC, Cleveland, OH (US)

(72) Inventors: Hemanshu Nigram, Oak Park, CA (US); Michael Lang, Phoenix, AZ (US); James Drolshagen, Wheaton, IL (US)

(73) Assignee: OPTiMUM iD LLC, Cleveland, OH (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/737,460

(22) Filed: Jun. 11, 2015

(65) Prior Publication Data

US 2017/0019400 A1 Jan. 19, 2017

Related U.S. Application Data

(60) Provisional application No. 62/010,567, filed on Jun. 11, 2014.

(51) Int. Cl.
*H04L 29/06* (2006.01)
*G06K 9/00* (2006.01)
*G06Q 50/18* (2012.01)

(52) U.S. Cl.
CPC ...... *H04L 63/0861* (2013.01); *G06K 9/00255* (2013.01); *G06K 9/00288* (2013.01); *G06K 9/00892* (2013.01); *H04L 63/107* (2013.01); *G06Q 50/18* (2013.01); *H04L 63/083* (2013.01); *H04L 63/0853* (2013.01)

(58) Field of Classification Search
None
See application file for complete search history.

(56) References Cited

U.S. PATENT DOCUMENTS

| | | | |
|---|---|---|---|
| 5,659,731 A * | 8/1997 | Gustafson | G06F 17/3053 |
| 7,931,194 B2 * | 4/2011 | Keys | G06Q 20/341 235/379 |
| 8,355,528 B2 | 1/2013 | Bladel | |
| 8,443,202 B2 | 5/2013 | White | |
| 8,620,942 B1 * | 12/2013 | Hoffman | G06Q 10/107 707/766 |
| 8,671,143 B2 | 3/2014 | Lewis | |
| 8,724,908 B2 | 5/2014 | Dale | |
| 8,739,260 B1 * | 5/2014 | Damm-Goossens | H04W 12/06 726/4 |
| 8,831,677 B2 | 9/2014 | Vill-Real | |
| 9,202,105 B1 | 12/2015 | Wang | |
| 2002/0175211 A1 | 11/2002 | Dominguez | |
| 2005/0010796 A1 | 1/2005 | Amouse | |
| 2006/0050932 A1 | 3/2006 | Tumey | |

(Continued)

OTHER PUBLICATIONS

PCT/US2015/0535586 International Search Report and Written Opinion dated Dec. 28, 2015.

*Primary Examiner* — Henry Tsang

(57) ABSTRACT

The methods and systems are designed to utilize an integrated combination of just in time, just in place, and just on device actions connected to an mage recognition process to reduce or remove the risk of a User utilizing fake or stolen credentials in order to get verified.

19 Claims, 8 Drawing Sheets

(56) References Cited

U.S. PATENT DOCUMENTS

| | | | |
|---|---|---|---|
| 2007/0252001 A1 | 11/2007 | Kail | |
| 2008/0033740 A1* | 2/2008 | Cahn | G06Q 10/00 726/2 |
| 2009/0164796 A1 | 6/2009 | Peirce | |
| 2009/0204434 A1 | 8/2009 | Breazeale | |
| 2010/0008535 A1 | 1/2010 | Abulafia | |
| 2010/0312763 A1 | 1/2010 | Peirce | |
| 2010/0223663 A1 | 9/2010 | Morimoto | |
| 2011/0125656 A1 | 5/2011 | Kingery | |
| 2011/0209200 A2 | 8/2011 | White | |
| 2011/0276484 A1* | 11/2011 | Pearson | G06Q 20/38 705/44 |
| 2012/0075442 A1* | 3/2012 | Vujic | G07C 9/00087 348/61 |
| 2012/0114199 A1 | 5/2012 | Panyam | |
| 2012/0143760 A1 | 6/2012 | Abulafia | |
| 2012/0148115 A1 | 6/2012 | Bridwell | |
| 2013/0204786 A1 | 8/2013 | Mattes | |
| 2013/0222600 A1* | 8/2013 | Donovan | G08B 13/19645 348/159 |
| 2013/0298079 A1 | 8/2013 | Mattes | |
| 2013/0290119 A1 | 10/2013 | Howe | |
| 2013/0297414 A1 | 11/2013 | Goldfarb | |
| 2014/0052636 A1 | 2/2014 | Mattes | |
| 2014/0087780 A1 | 3/2014 | Abhyanker | |
| 2014/0101047 A1 | 4/2014 | Gardiner | |
| 2014/0101048 A1 | 4/2014 | Gardiner | |
| 2014/0129596 A1 | 5/2014 | Howe | |
| 2014/0270403 A1 | 9/2014 | Langley | |
| 2014/0280260 A1* | 9/2014 | Boukobza | G06F 17/30345 707/756 |
| 2014/0289819 A1 | 9/2014 | Lindemann | |
| 2014/0289820 A1 | 9/2014 | Lindemann | |
| 2014/0289833 A1 | 9/2014 | Briceno | |
| 2015/0095352 A1* | 4/2015 | Lacey | G06F 17/30011 707/752 |
| 2015/0106627 A1* | 4/2015 | Holman | G06F 21/602 713/189 |
| 2015/0206136 A1 | 7/2015 | Maddocks | |
| 2015/0235217 A1 | 8/2015 | Perez | |
| 2015/0271777 A1 | 9/2015 | Torgersrud | |
| 2015/0317631 A1 | 11/2015 | Lesbirel | |
| 2015/0334099 A1* | 11/2015 | Zhang | G06F 21/45 726/6 |
| 2016/0071111 A1 | 3/2016 | Wang | |
| 2016/0239653 A1 | 8/2016 | Loughlin-Mchugh | |
| 2016/0239657 A1 | 8/2016 | Loughlin-Mchugh | |
| 2016/0239658 A1 | 8/2016 | Loughlin-Mchugh | |
| 2016/0241531 A1 | 8/2016 | Loughlin-Mchugh | |
| 2016/0241532 A1 | 8/2016 | Loughlin-Mchugh | |
| 2016/0350547 A1 | 12/2016 | Loughlin-Mchugh | |
| 2016/0350861 A1 | 12/2016 | Loughlin-Mchugh | |
| 2017/0046583 A1 | 2/2017 | Rodriguez | |
| 2017/0048244 A1 | 2/2017 | Loughlin-Mchugh | |
| 2017/0134366 A1 | 5/2017 | Genner | |
| 2017/0162031 A1 | 6/2017 | Drolshagen | |
| 2017/0169362 A1 | 6/2017 | Loughlin-Mchugh | |
| 2017/0255769 A1 | 9/2017 | Loughlin-Mchugh | |
| 2017/0301052 A1 | 10/2017 | Abt | |

* cited by examiner

METHODS AND SYSTEMS FOR PROVIDING ONLINE VERIFICATION AND SECURITY

CROSS-REFERENCED APPLICATIONS

This application claims priority to and all benefits of provisional patent application Ser. No. 62/010,567, filed Jun. 11, 2014, which is incorporated by reference herein.

BACKGROUND

As web traffic continues to increase, electronic identification theft has been growing exponentially. Such electronic identification theft can originate from anywhere in the world. Electronic identification theft costs many millions of dollars in losses and can have a lasting emotional effect on the victims. Accordingly, new methods and systems for providing online verification and security are needed.

SUMMARY

Various embodiments provide methods and systems for providing online verification and security. Some embodiments include methods for providing a secured system.

For example, a method for providing a secured system can include the steps of taking a photograph of face at first location with a device comprising a clock and a GPS; tagging the photograph of face with GPS coordinates of the first location; tagging the photograph of face with a time and date of the taking the photograph of face; taking a photograph of an identification card comprising a picture at a second location; tagging the photograph of an identification card with GPS of the second location; tagging the photograph of an identification card with a time and date of the taking the photograph of the identification card; sending the photograph of the face and the photograph of the identification card to a site; receiving the photograph of the face and the photograph of the identification card, comparing the photograph of the face and the picture in the photograph of the identification card; determining if the photograph of the face and the picture are the same; determining if the GPS coordinates of the first location and the GPS of the second location are substantially the same; determining if the time and date of the taking the photograph of face and the time and date of the taking the photograph of the identification card are within a defined time window; and generating the authorization key, if the photograph of the lace and the picture are the same, if the first location and the GPS of the second location are substantially the same, and if the taking the photograph of face and the time and date of the taking the photograph of the identification card are within the defined time window.

In some embodiments, the authorization key is a token configured to allow as User to access secured websites. The method can include the step of: collecting data comprising at least one of a name, an address, a birthdate, and a gender from the photograph of the identification card and connecting the data to the authorization key. The method can be part of a mobile application, which improves security for a range of interact-related activities.

Additional methods fix providing a secured system and various systems for providing online verification and security are described herein. Some embodiments of the methods and systems provide an "identification card" for the internet. Applications for such methods and systems can include, for example: dating sites, online employment applications, legal notary services, childcare services, online gambling, and secured social networking sites.

DRAWINGS

The present disclosure will become more fully understood from the description and the accompanying drawings, wherein.

Figure 1:
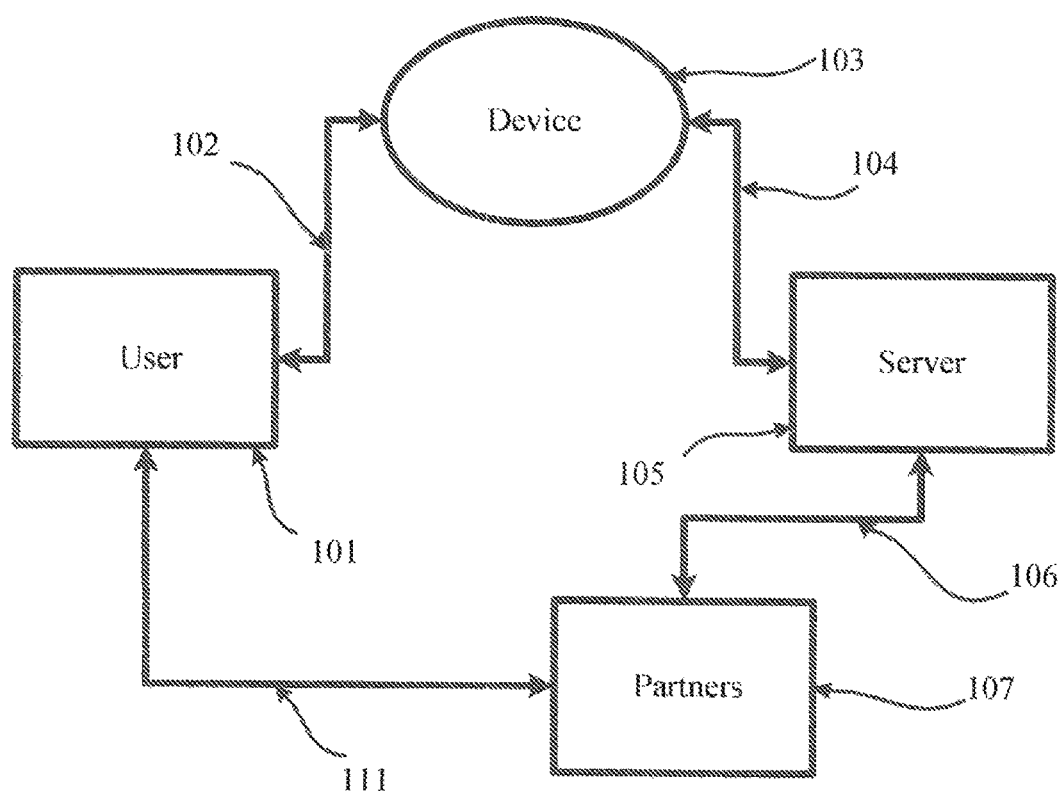
FIG. 1 is a flowchart illustrating various elements for providing the online verification methods and systems, in accordance with various embodiments.

The drawings described herein are for illustrative purposes only of selected embodiments and not all possible implementations, and are not intended, to limit the scope of any of the exemplary embodiments disclosed herein or any equivalents thereof. It is understood that the drawings are not drawn to scale. For purposes of clarity, the same reference numbers will be used in the drawings to identify similar elements.

DESCRIPTION

The following description is merely exemplary in nature and is in no way intended to limit the exemplary embodiments, their application, or uses. It should be understood that steps within a method may be executed in different order without altering the principles of the present disclosure. For example, various embodiments may be described herein in terms of various functional components and processing steps. It should be appreciated that such components and steps may be realized by any number of hardware components configured to perform the specified functions.

Various embodiments provide methods and systems for providing online verification and security. Some embodiments include methods for providing a secured system. Various methods and systems, described herein, can be a mobile application, which improves security throughout a whole range of internet-related activities.

In some embodiments, methods and systems, described, herein, improve security for online or internet-related activities in at least three ways. First, individual users are provided the means to prove their identity on the Internet through a proprietary process of ID verification in time, place, and device. Second. Internet providers are provided the means to verify that their own users are using their real identities, and that the person who currently is using their service is indeed that verified individual. Third, the public is provided the means to ensure that they are not being misled, harassed, or threatened by anonymous or fraudulent Internet miscreants.

The methods and systems are designed to utilize an integrated combination of just in time, just in place, and just on device actions connected to an image recognition process to reduce or remove the risk of a User utilizing fake or stolen credentials in order to get verified.

For example, a method of identification verification can include accessing the verification application on a mobile device and completing a registration process. The verification application can be interfaced with a verification engine on webserver, which is communication with the mobile device. In some cases, it may appear to the User that the verification application is doing an analysis to determine an outcome, but the analysis is actually being run by the verification engine. First, the User is instructed to take a picture or a short video of him/her with their mobile device ("User photo"). The User can be allowed to repeat this process until the User is satisfied with the image. The User is then given a limited number of minutes to take a photograph of their government identification card ("ID Card photo"), such as, for example, a driver's license, a state ID card, a passport, a school ID, or any such identification device, which has a photograph of the User.

The verification application can capture the time, date, and GPS coordinates for the User photo and the ID Card Photo. In some aspects, the verification application can capture the meta-data from the User's mobile device. The verification application determines if the process of taking the User photo and the ID Card photo are completed in the same time, in the same place, and on the same device. If yes, the process continues. If no, the verification application notifies the User to repeat the process of taking the User photo and the ID Card photo.

The ID Card photo is processed. First, the User photo is compared to the photo of the User in the ID Card photo using facial-recognition routines to determine if the same person is on both photos. Second, identification information ("ID Info"), which is in text form in the ID Card photo, can be captured using an OCR routine. The ID Info can include name, address, birthdate, gender, driver's license number, and/or any other information on the government identification card. In some applications, the ID Info can be read from a barcode on ID Card. If the barcode is located on a back side of the ID Card, a second ID Card photo of the back of the ID Card may be required. The ID Info can be compared to the information provide in the registration process.

In addition, the verification application can verify that the ID Info is valid via a comparison with the appropriate governmental records. For certain applications, the verification application can verify that the ID info is not on the National Sexual Predator List or similar sexual predator database.

If the application confirms that, the process of taking the User photo and the ID Card photo are completed in the same time, in the same place, and on the same device, and if the facial-recognition routines determine that the same person is on the User photo and the ID Card photo, and if the ID Info is valid via a comparison with the appropriate governmental records, then verification application will determine the User is "Verified" (or "Veried™"). Once the verification application has Verified the User, the application issued an authorization key to the User. In some applications, the authorization key is a token configured to allow the User to access secured websites. For example, the token can be provided to various online providers.

In some applications, one or more addition requirements can be used to determine if the User is Verified. For example, an additional requirement can be if the ID Info is not on the National Sexual Predator List or similar sexual predator database. For example, an additional requirement can be a certain age limit (as compared to ID Info), which may be required for any internet activity directed to tobacco, alcoholic beverages, or online gambling. An additional requirement can be entry of a state or board professional license, which can be determined if the license is valid via a comparison with the appropriate governmental or professional organization records. Such a professional license can include but is not limited to: law license, boards for doctors, hoards for dentists, contractor license, notary certification, beautician license, bonding, chauffer license, and the like.

All of the requirements to be Verified, as well as, the ID Info, the User photo, the ID Card photo, and the meta-data are connected to a User Profile, which can be connected to or part of the token. Other information that can be connected to the User Profile can include, but are not limited to: criminal background checks, state or board professional licenses, product usage, interact usage, survey results, social networking pictures of User (which can be used for further verification), sexual and/or dating preferences, data from internet providers, and the like. In some applications, the User can connect information to the User Profile.

In some embodiments, a User can control the privacy setting of the User Profile and the web provider (partner) can control settings for the required information needed from the User. In some applications, the User can set the privacy setting to anonymous, however, the web provider has all of the required information that is necessary to be Verified. If the anonymous User becomes a web bully or a predator, the web provider can remove the Verification from the User. In addition, the web provider has all the information to identify such a rogue User, which can be turned over to the authorities if any cybercrimes have been committed. In some applications, the User can set the privacy setting to allow various social networking information or business contact information to be connected to the token. For example, the User can connect Facebook pages, Twitter accounts, blog pages, websites, and the like to the token, all of which can be viewed by others (either publicly or limited to certain web providers (partners)) based on the privacy setting chosen by the User.

In some embodiments, the data can be collected and connected to the token every time the token is used or logged in. For example, such data can include, but is not limited to when was it used (time/date), device it was used from, device ID it was used from, website/service where it was used, product that it was used for, number of times token was checked/verified by outside users, websites on which those verifications took place, products for which those verifications took place, device from which those verifications took place, and/or demographic information on Users that verified an ID.

From time to time, the verification application can be configured to recheck any of the requirements. For example, once a year, the verification application can be configured to recheck the ID info against the National Sexual Predator List or similar sexual predator database.

In some embodiments, secondary verification data can be collected and connected to the token. The verification application can prompt the User to read a couple of sentences into their mobile device, which is recorded by the verification application. This recording can be stored for use in voice-recognition applications. For example, the verification application ma ask the User to apply a thumbprint and/or fingerprint to an interface on their mobile device. The thumbprint and/or fingerprint is recorded as a secondary verification data and stored for use in fingerprint-recognition applications. In other example, the verification application may ask the User to an image of the User's retina. The retina image is recorded as a secondary verification data and stored for use in image-recognition applications. From time to time the User may be asked to renew their Verification status by completing the above process again.

In some embodiments the verification application may request of proof from the User that the person using the device is actually the User. This request may be generated on a prescribed time period or randomly. This request may be generated when the application identifies that the GPS of the device is outside a boundary. The boundary can be changed by the User. For example, if User resides in Texas and the device is being used in Nigeria, a request of proof from the User is generated. In another example, if User's device is being used in domestically but in a different time zone, a request of proof from the User is generated.

For example, the form of proof can be a request for the User to take a new User photo, which is submitted and compared, using the facial-recognition routine, to User photo(s) and ID Card photo(s) in the User Profile. For example, the form of proof can be a request for the User to read a few words aloud into the verification application, which is submitted and compared, using voice-recognition routine, to previously recorded User's voice in the User Profile. For example, the form of proof can be a request for the User to apply a fingerprint and/or a thumbprint or both to an interface on their mobile device, which is submitted and compared, using a fingerprint-recognition routine to the fingerprint and/or thumbprint of User in the User Profile. For example, the form of proof can be a request for the User to take an image of the eye retina, which is submitted and compared to the image of the eye retina of the User in the User Profile.

Partners can connect with verification system ("Verie") through a secure API, which provides the partners with the means to deliver verification technology to their end users' smartphones. After verifying a User's identity, the verification system can quickly re-verify a user anytime, anyplace.

Some embodiments provide a verification engine, which is an identity verification technology solution. By combining a proprietary smartphone-based identification application with an enterprise API, the verification engine allow partners to verify that an online individual is truly who they say they are. The verification engine can confirm that a person's online identity is real, and that it belongs to the person who is claiming it. The verification engine can identify the physical location of the individual. The verification engine establishes an identification, which cannot be duplicated, because it is uniquely tied to the individual's smartphone.

In some embodiments, a User creates a User Profile by submitting a five second video clip of their face and a snapshot of the front and back of their driver's license through a verification app, which has been loaded the User's smartphone. The verification app sends the video and the images to a verification engine, which matches the facial video with the ID photo and determines if the ID Card is legitimate. Voice-prints are then recorded then sent to the verification engine to make future re-verifications quick and unobtrusive. Once the User's ID is recorded, face matched, and registered, the User's smartphone becomes the User's online proof of identity.

In some embodiments, a method for providing a secured system can include the steps of: taking a photograph of face at first location with a device comprising a clock and a GPS; tagging the photograph of face with GPS coordinates of the first location; tagging the photograph of face with a time and date of the taking the photograph of face; taking a photograph of an identification card comprising a picture at a second location; tagging the photograph of an identification card with GPS of the second location; tagging the photograph of an identification card with a time and date of the taking the photograph of the identification card; sending the photograph of the face and the photograph of the identification card to a site; receiving the photograph of the face and the photograph of the identification card; comparing the photograph of the face and the picture in the photograph of the identification card; determining if the photograph of the face and the picture are the same; determining if the GPS coordinates of the first location and the GPS of the second location are substantially the same; determining if the time and date of the taking the photograph of face and the time and date of the taking the photograph of the identification card are within a defined time window; and generating; an authorization key, if the photograph of the face and the picture are the same, if the first location, and the GPS of the second location are substantially the same, and if the taking the photograph of face and the time and date of the taking the photograph of the identification card are within the defined time window.

In some embodiments, the authorization key is a token configured to allow a User to access secured websites. The tags on the User photo and/or the ID Card photo can include the unique device ID, a device type, and in some applications, the operating software (OS) on the device.

The method can include the step of collecting data comprising at least one of a name, an address, a birthdate, and a gender from the photograph of the identification card and connecting the data to the authorization key. Further, the data can also include: ID type, ID number, issue date, expiration date, and identifying information such as height, weight, eye color hair color, organ donor, any other available identifying information).

The method can include the step of: comparing the data to a database and determining if the database identifies a defined null value. For example, the data base comprises a criminal history and the defined null value is a sexual predator conviction. The method can include automatic cross checking of Users against databases (such as, sex offender registry, criminal background, credit check, etc.). The method can include the step of denying the authorization key if the database identifies the defined null value. The method can include the step of comprising denying the authorization key if an age as calculated by the birthdate is below a defined age threshold. For example, the defined age threshold is 21 years old (applications such as alcoholic beverages). For example, the defined age threshold is 18 years old (applications such as online gambling and tobacco). For example, the defined age threshold is 13 years old (applications such as general use of the internet).

In some embodiments, the GPS coordinates can include the angle the photo was taken using the gyroscope in the device. In some aspects of these embodiments, a first photo of the ID Card is taken at a first angle and a second photo of the ID Card is taken at a second angle. The first angle and the second angle can be recorded by the device and tagged to the photos. A holograph or an embossed symbol may be identified on the ID Card by using the angle of the first photo and the angle of the second photo.

In some embodiments, the User photo and the ID Card photo must be taken within a defined time period. For example, the User photo and the ID Card must be taken within a one minute time period. This time period can be varied depending on the application. The GPS coordinates tagged to the User photo and tagged to the ID Card photo must be within a defined distance. For example, the GPS coordinates tagged to the User photo and tagged to the ID Card photo must be within 20 feet. In another example, the GPS coordinates tagged to the User photo and tagged to the ID Card photo must be within 3 feet. The defined distance of the GPS coordinates can be varied depending on the application; however, this distance must be greater than the margin of error of the GPS based on the capabilities of the device and the accuracy of the satellites used by the GPS.

Some embodiments provide a method for providing a secured system. The method can include the steps of generating an image of a face of a user at first location with a device comprising a clock and a GPS; tagging the image with GPS coordinates of the first location; tagging the image with a time and a date of the generating of the image; generating an image of an identification card comprising a picture of the user at a second location; tagging the image of the identification card with GPS coordinates of the second location; and tagging the image of an identification, card with a time and date of the generating of the image of the identification card.

The method can further include the steps of comparing the image of the face and the image of the picture of the user; determining the likelihood that the image of the face and the image of the picture of the user are substantially the same; determining if the GPS coordinates of the first location and the GPS of the second location are substantially the same; determining if the time and date of the generating the image of face and the time and date of the generating the image of the identification card are within a defined time window. One or more of these steps can be carried out by a verification engine on a web server.

The method can further include the step of generating an authorization key, if the image of the face and the image of the picture of the user are substantially the same, if the first location and the GPS of the second location are substantially the same, and if the time and date of the generating the image of face and the time and date of the generating the image of the identification card are within the defined time window.

In some aspects, the authorization key is a token configured to allow a user to access a secured website. In some aspects, the method can include the step of collecting data comprising at least one of a name, an address, a birthdate, and a gender from the photograph of the identification card and connecting the data to a user profile. The data can include at least one of an identification card type, an identification card number, an identification card issue date, an identification card expiration date, and an identification card issuing, agency. The data can include at least one of a height, a weight, an eye color, a hair color, an organ donor status, and a bar code.

The method can include the step of denying the authorization key if an age as calculated by the birthdate is below a defined age threshold. The method can include the steps of comparing the data to a database; determining if the database identifies a defined null value; and preventing the generating the authorization key if the null value is identified. The database can include a sex offender registry and the defined null value is a sexual predator. The database can include a criminal history and the defined null value is a criminal conviction. The database can include a credit history and the defined null value is a credit score below as defined value. The method can include the step of denying the authorization key if an age as calculated by the birthdate is below a defined age threshold.

The method can include the steps of scanning the image of the identification card for a hologram; comparing the hologram to a standard from a database; determining if the identification card is fraudulent; and preventing the generating of the authorization key if the identification card is fraudulent. The method can include the step of initiating an app on the device, the app configured to carry out all of the steps of the method. The method can include the step of retrieving device identification data from the device.

The method can include the steps of tagging the image with the device identification data of the device generating the image of the face; and tagging the image of the identification card with the device identification data of the device generating the image of the identification card. The method can include the step of determining if the device identification data of the device generating the image of face and the device identification data of the device generating the image of the identification card are the same.

The method can include the step of generating the authorization key, if the image of the face and the image of the picture of the user are substantially the same, if the first location and the GPS of the second location are substantially the same, if the time and date of the generating the image of face and the time and date of the generating the image of the identification card are within the defined time window; and if the device identification data of the device generating the image of face and the device identification data of the device generating the image of the identification card are the same.

The method can include the steps of receiving and storing an initial secondary identifier after the generating the authorization key; requesting user to input a secondary identifier at a later time; receiving the secondary identifier from the user; comparing the secondary identifier to the initial secondary identifier; determining if the secondary identifier and the initial secondary identifier are substantially the same; and renew the authorization key if the secondary identifier and the initial secondary identifier are substantially the same.

The secondary identifier can be one of: a voice pattern generated by the user and captured by a microphone on the device; an image of a retina of a user's eye captured by the device; at least one fingerprint of the user captured by the device; a palm scan of the user captured by the device; a photo of the user captured by the device; a RFID tag tethered to the device; and a password.

Some embodiments provide a system for secured transactions over a network. The system can include an app, which is downloadable to a device, a verification engine on a server at the location on the network, and a verification token configured to allow the user access to at least one restricted website.

The device can be a smart phone or tablet, however, the device has at least a camera, a GPS locator, a network interface, and a user interface.

In some configurations, the app includes: a process to imitate a user to take and capture a picture of a user's face with the camera; a process to capture a first set of GPS coordinates, a first time, and a date of the picture of the user's face; a process to initiate the user to take and capture a picture of an identification card with the camera; a process to capture a second set of GPS coordinates, a second time, and a date of the picture of the identification card; a process to capture identification data of the device; a process to send data comprising at least one of the picture of the user's face, the picture of the identification card, the first set of GPS coordinates, the second set of GPS coordinates, the time and date of the picture of the user's face, the time and date of the picture of the identification card, and the identification data to a location on the network; and a process to receive and communicate information.

In some configurations, the verification engine includes: an input configured to receive the data from the app; an image comparison algorithm configured to compare the picture of the user's face, the picture of the identification card, then determine the likelihood that the user and a person in the picture of the identification card are substantially the same; a location comparison algorithm configured to determine if the first set of GPS coordinates and the second set of GPS coordinates are substantially the same; and a time comparison algorithm configured, to determine if the time and date of the picture of the user's face, the time and date of the picture of the identification card are substantially the same.

In some configurations, the is configured to be send to the app if the user and a person in the picture of the identification card are substantially the same, if the first set of GPS coordinates and the second set of GPS coordinates are substantially the same, and if the time and date of the picture of the user's face, the time and date of the picture of the identification card are substantially the same.

In some aspects, the system includes a not verified message configured to be sent to the app if at least one of an outcome of the image comparison algorithm is negative, or if an outcome of the location comparison algorithm is negative, or if an outcome of the time comparison is negative.

The system can include a secondary verification system. The secondary verification system can be configured to receive and store an initial secondary identifier at a first time; receive a second secondary identifier at a second time; compare the second secondary identifier to the initial secondary identifier; determine if the second secondary identifier and the initial secondary identifier are substantially the same; and renew the verification token if the second secondary identifier and the initial secondary identifier are substantially the same.

The secondary identifier can be an image of a retina of a user's eye captured by the camera. The secondary identifier can be at least one fingerprint of the user captured by the device. The secondary identifier can be a voice pattern generated by the user and captured by a microphone on the device.

The system can include an interface between the verification engine and a third-party server. The interface can be configured to send verification parameters from the third-party server and to receive results from verification engine. The system can include an interface between the verification token and a third-party server, wherein the interface is configured to notify the third-party server that the verification token has been sent to the user.

The system can include a user profile comprising a user name and at least one piece of data from the identification card. In some configurations, the at least one piece of data comprises at least one of a legal name, an address, a birthdate, a gender and a picture of the user. In some configurations, the verification engine is configured to col-lect text from the identification card, convert the text into the at least one piece of data and enter the at least one piece of data into the user profile. In some configurations, the user profile comprises the identification data from the device. In some configurations, the user profile is configured to allow the user to add personal information. In some configurations, the personal information comprises at least one of an email address, a social media page, a credit card, a marital status, a military status, a school, and a student number. The system can include a privacy setting configurable by the user and controlling which items in the user profile are viewable by other users.

Now with reference to FIG. 1, a flowchart illustrates various elements for providing the online verification methods and systems. The User 101 operates the device 103 via, user interface 102. The device 103 can be any device with a user interface 102, an image capture mechanism, and web capabilities. An imam capture mechanism can be a digital device, a mechanical device, or a combination of both. The web capabilities can be a Wi-Fi interface, a Bluetooth interface, a mobile service interface, or any other such system or device, now known or developed in the future. Examples of the device 103 can include smartphones, tablets, and other such devices. For example, the device 103 can be an iPhone, an iPad, an apple watch, and other such devices. Examples of the device 103 can include phones and tablets, which operate on android operating systems. Other examples of the device 103 can include phones and tablet, which operate on Microsoft operating systems. In some aspects, the device 103 can be a laptop computer with wireless network capabilities and an image capture device. The device 103 can interface with the server 105 via a network, such as a cloud. The device 103 can have an verification app 104 (sometimes referred to as an "app" herein) installed which can communicate with the User 101 via the user interface 102 and communicate with the server 105 via a network connection. The server 105 interfaces with partners 107 via link 106, which can be a third-party content provider or third-party web service. A verified access key 111, which can be a token, allows the User 101 to use a service or access a website of one of the partners 107.

Figure 2:
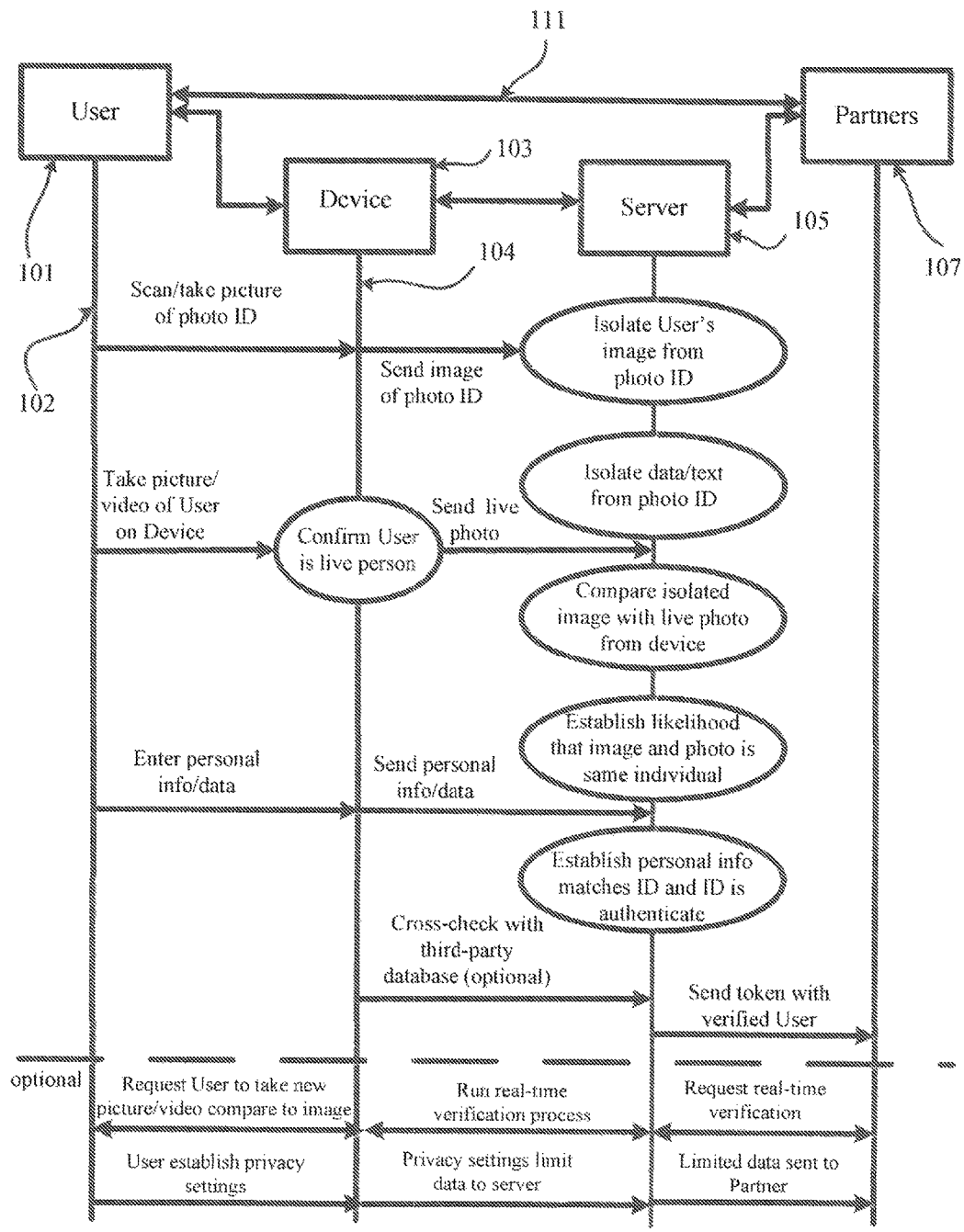
FIG. 2 is a flowchart illustrating an exemplary process flow of verification between the various elements for providing the online verification methods and systems as illustrated in FIG. 1, in accordance with various embodiments.

In FIG. 2, a flowchart illustrates details of an exemplary process flow of verification between the various elements for providing the online verification methods and systems as illustrated in FIG. 1. As illustrated in FIG. 2, User 101 ran use the device 103 to generate an image of an identification card ("ID"), which is stored on the device 103 by verification app 104. A verification engine on the server 105 isolates the User's image from the ID ("ID photo") and isolates personal data from the text and/or bar code on the ID.

The User 101 takes one or more pictures or a video of self with the device 103 ("User photo"). In some configurations, the verification app 104 can be used to confirm that the User 101 in the picture or video is a live person. In some configurations, the verification engine on the server 105 can be used to confirm that the User 101 in the picture or video is a live person.

The User 101 provides a self-image by using the device 103 to take One or more pictures or video of the User's face. One or more stills from the video can be compared to confirm that the self-image is that of a live person. In the alternative, two or more pictures compared to confirm that the self-image is that of a live person. These comparisons, using either photos, stills from a video, or a combination of both, can be a "liveness test". In some embodiments, a "liveness test" can be performed to confirm that the self-image is of a living person. For example, a short video make be taken and the User 101 is asked to open and close eyes during the video. In an example, the video can be scanned for still images of open eyes and of closed eyes. If both types of images exist, then the self-image passes the "liveness test" and the user considered a living person. Another example can include a first photo with eyes open and a second photo with eyes close. If both of these photos are sent then an algorithm can be used to confirm that the User's image is that of a living person. For these examples, a smile/no smile could be substituted for the eyes opened/closed. For these examples, a hand on face/no hand on face could be substituted for the eyes opened/closed. As is obvious to one skilled in the art, any number of different positions, gestures, expressions during the self-image photos or video could be used. In another example, a short video make be taken while moving the camera around the User's face, for example moving the camera for ear to ear in a motion that is somewhat perpendicular to the face. In an example, the video can be scanned for different views of the face, which can used to determine that the User face is a 3D object, which passes the test and the User 101 is a living person (not a photo of a 2D picture). Another example can include a first photo of the front of the User's face and a second photo of a side angle of the User's face. If both of these photos are sent then an algorithm can be used to confirm that the User's self-image is that of a living person. In such an example, the angle the photos were taken can be determined by using a gyroscope in the device 103. Of course these and other examples can be combined to send both 313 views of the User's face and different gestures/expressions on the User's face to an algorithm to confirm that the User's self-image is that of a living person.

The verification engine compares the User photo with the ID photo then establishes the likelihood that the User photo and the ID photo are images of the same person. The User 101 enters personal data into the app 104 and the verification engine determines if the entered personal data matches the personal data from the ID. In addition, the validity of the ID is determined by a comparison, with an appropriate database. The personal data and images are stored on the server 105. The identification data from the device 103 ("device ID") can be retrieved by the app and stored on the server 105. A User Profile can include the User photo, the ID photo, the personal information, and the device ID. If the entered personal information and the personal information from the ID matches and the User photo and the ID photo are likely the same person, and the ID is valid, then the server 105 sends a token to one or more of the partner 107, which establishes that the User 101 is verified. The token can be used as or used to establish a verified access key 111, which allows the User 101 to interface with the partner 107. The token can be sent to the verification app 104 on the device 103, which allows the User 101 to access partner 107 with device. If token is sent to device 103, the User 101 may have access to a group of partners who accept a User 101 who has been verified.

Some optional aspects are also illustrated on FIG. 2. In an option, the partner 107 can request and receive additional information from User 101, which is used to determine if the User 101 can be verified. If the User 101 passes the criteria set for the additional information, then the server 105 sends a token to one or more of the partner 107, which establishes that the User 101 is verified. In an option, the server 105 can crosscheck the User 101 against a third-party database, such as, for example, a sexual predator database, criminal history database, credit history, or the like. If the User 101 passes the criteria set for the third-party database, then the server 105 sends a token to one or more of the partner 107, which establishes that the User 101 is verified.

In still another option, the partner 107 can require real-time verification from the User 101. The partner 107 can send a request to the User 101 to provide a new User photo before access can be permitted. The User 101 takes a new User photo, as described herein, which sent to the server 105 and determined if the new User photo is the same person, who was originally verified. If the new User photo confirms that the User 101 is the same person, who was originally verified, then server renews or sends a new token to partner 107, which grants access to User 101. Other examples of real-time verification are illustrated in FIG. 3.

Figure 5:
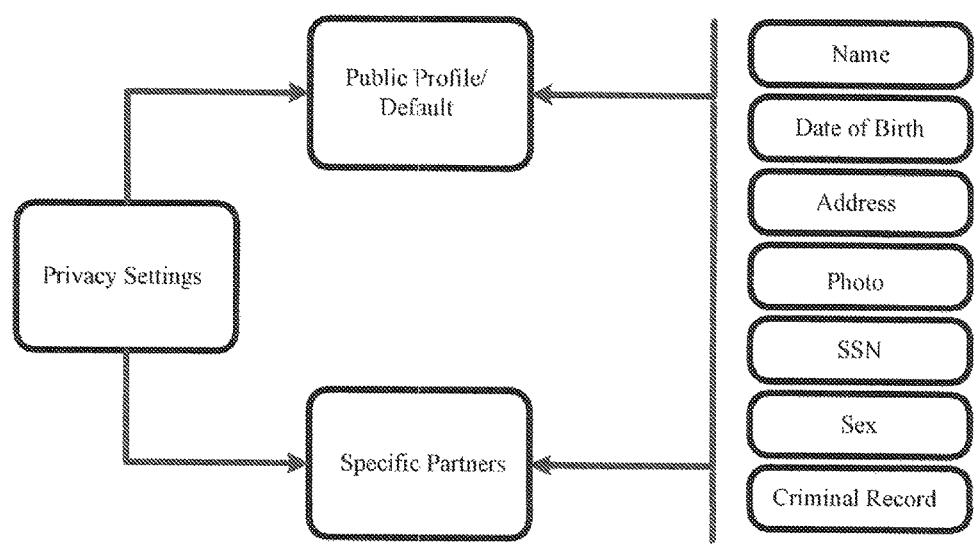
FIG. 5 is a flowchart illustrating an example of privacy setting for a User account, in accordance with various embodiments.

In another option, the User 101 can set the privacy of the User Profile, which has been entered into the server 105. The privacy setting of the User Profile can limit the information/data available to the partners 107. The privacy setting of the User profile can limit the information/data available to other users or the public. Other examples of privacy settings are illustrated in FIG. 5.

Figure 3:
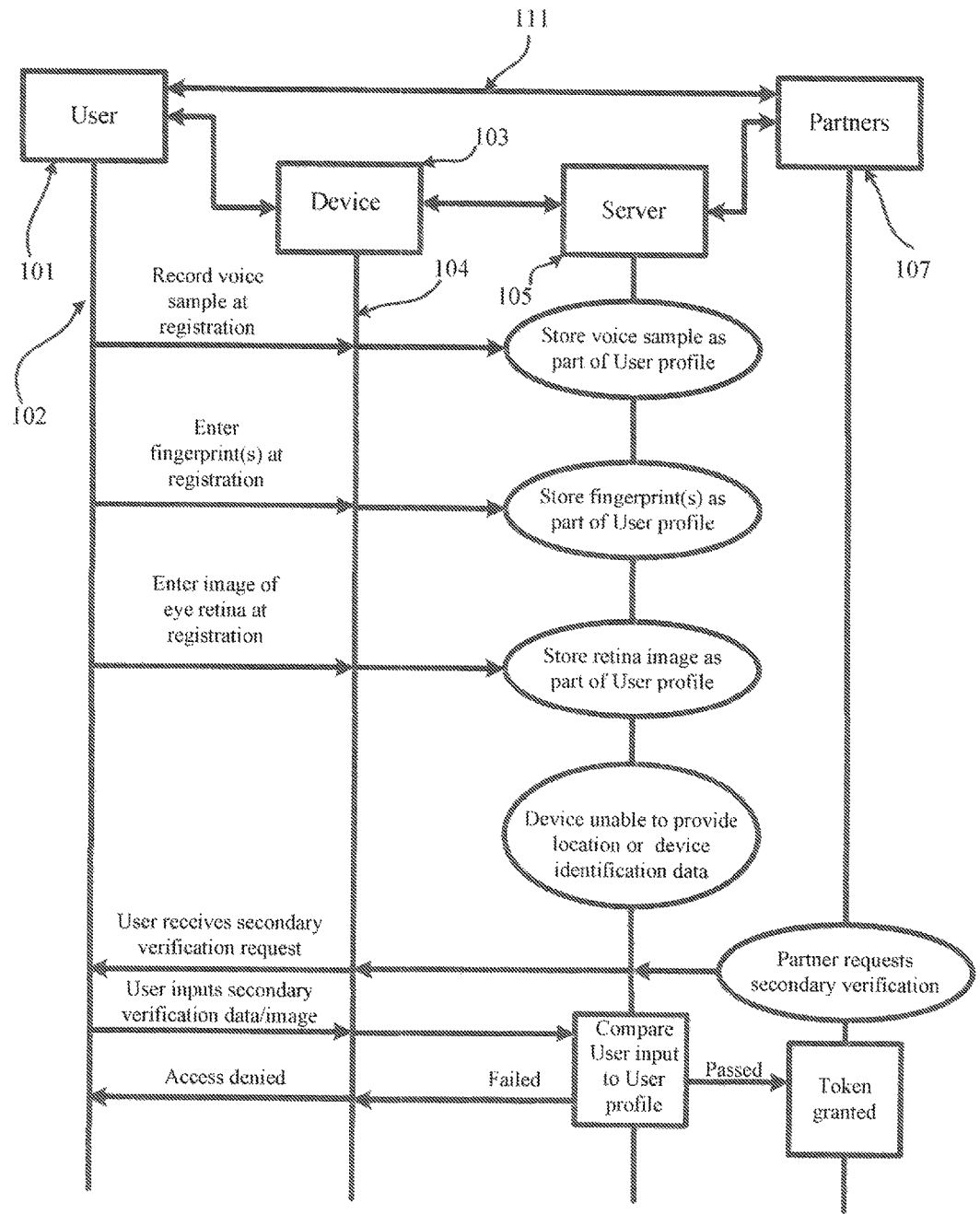
FIG. 3 is a flowchart illustrating an exemplary process flow of secondary verification between the various elements for providing the online verification methods and systems as illustrated in FIGS. 1 and 2, in accordance with various embodiments.

In FIG. 3, a flow/chart illustrates details of an exemplary process flow of secondary verification between the various elements for providing the online verification methods and systems as illustrated in FIGS. 1 and 2. For example, the verification app 104 can be configured to receive and store an initial secondary identifier on the server 105 after the token is created. The partner 107 can request User 101 for real-time verification, which requires the User 101 to input a secondary identifier, which is sent to the server 105. The server 105 compares the secondary identifier to the initial secondary identifier and determines if the secondary identifier and the initial secondary identifier are substantially the same. The server 105 sends/renews the token to the partner 107, if the secondary identifier and the initial secondary identifier are substantially the same. Examples of the secondary identifier include, but are not limited to a voice pattern generated by the User 101 and captured by a microphone on the device 103; an image of a retina of a User's eye captured by the device 103; at least one fingerprint of the User 101 captured by the device 103; a palm scan of the User 101 captured by the device 103; a photo of the User captured by the device; a RFID tag tethered to the device 103; and a password. The secondary identifier can be added to the User Profile.

As illustrated in FIG. 3, the User 10 lean enter at least one secondary identifier, which can be any of or all of a voice sample, an image of fingerprint(s), and an image of eye retina, into the device 103. The verification 104 sends the secondary identifier(s) to User Profile, which is stored on the server 105. When the partner 107 sends a request to the User 101 for secondary verification, the User 101 is required to enter the required secondary identifier, such as, the voice sample, the image of fingerprint(s), and/or the image of eye retina, into the device 103, within a limited time window. For example, within 1 minute of the receipt of the request. If the required secondary identifier is not entered within the limited time window, access to the partner 107 is denied. The required secondary identifier, as entered by the User 101, is sent to the server 105 to be compared to the secondary identifier, which is stored as part of the User Profile. If the User input matches the secondary identifier in the User Profile, a token is granted or renewed. However, the partner 107 can limit access within certain geographical boundaries. If the device 103 is outside of the boundaries, then access is denied. However, if the device 103 is outside of the boundaries the partner 107 may require real-time verification to determine if the verified User 101 is attempting to access partner 107. In some configurations, the partner 107 can deny access if the device 103 is unable to provide a location or provide device ID.

Figure 4:
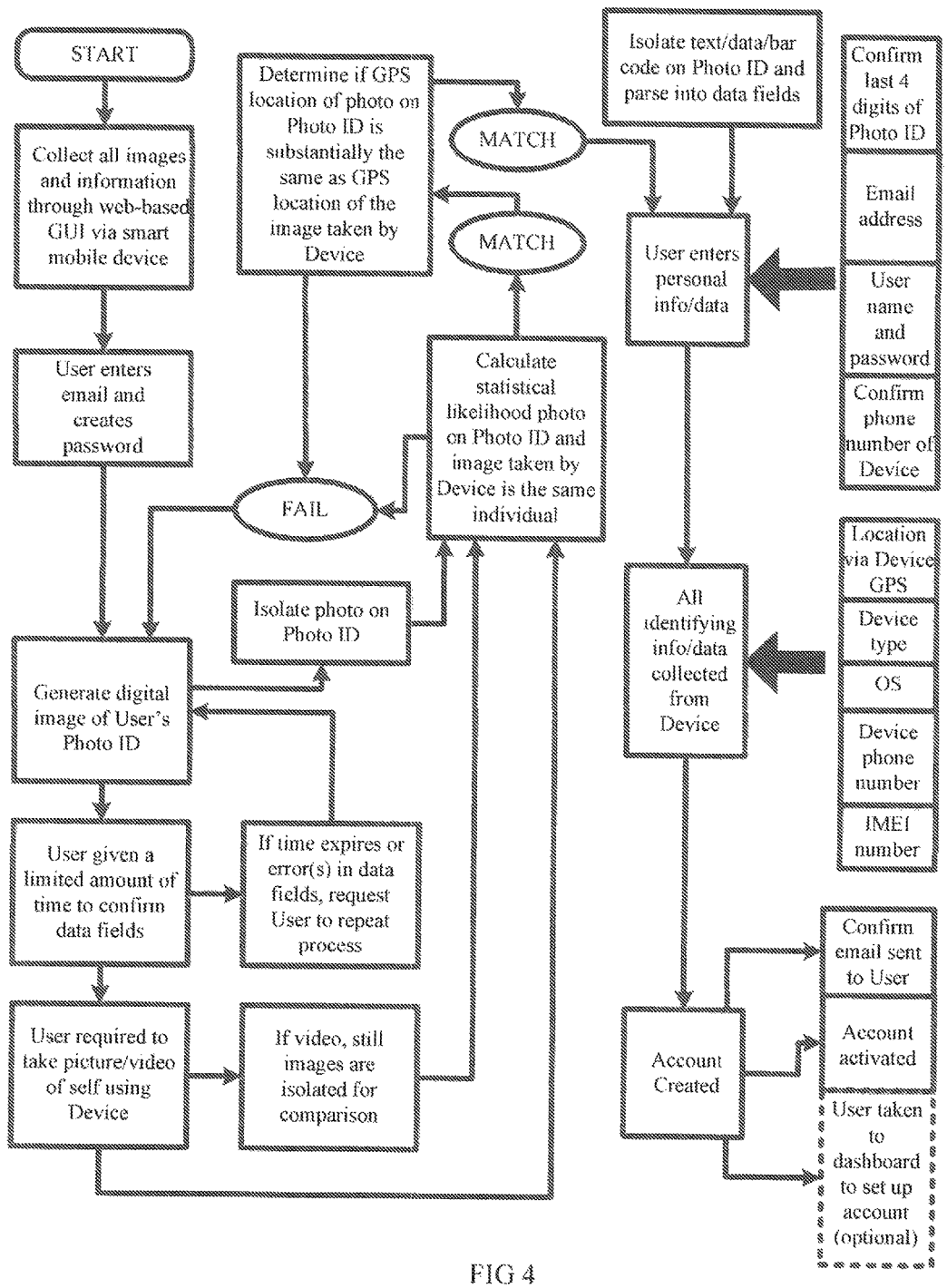
FIG. 4 is a flowchart illustrating an exemplary outline for creating a User account, in accordance with various embodiments.

FIG. 4 illustrates a flowchart, which outlines an exemplary outline for creating a User account. In some embodiments, the User 101 downloads the verification app 104 onto the device 103. The verification app 104 can require the User 101 to enter a user name and a password to begin the process to establish an account. The verification app 104 is configured to collect all images and data through the device 103. For example, the verification app 104 can control the camera of the device 103 to collect images. For example, the verification app 104 can provide the User 101 pages with areas to fill in required information/data. The verification app 104 can be a web based application, which is connected to verification engine residing, on a server 105 in a cloud that is in communication with the web.

As illustrated in FIG. 4, the device 103 is configured to collect all images and data through the verification app 104. The User 101 enters an email address and a password in verification, app 104. The User 101 generates a digital image of ID with the device 103. The app 104 sends the digital image of ID to server 105, which is configured to isolate the ID photo on the ID. In addition, the server 105 is configured to isolate text, data, and/or a bar code on the ID and parse the information into specific data fields. For example, the address is collected from the text on the ID or from a bar code on the ID and then this address is entered into the data field for addresses. The User 101 is then given a limited amount of time, for example 1 minute, to review and confirm the data fields. If the limited amount of time expires, then the User 101 is directed hack to the page that generates a digital image of ID. If a data field is incorrect, the User 101 may be allowed to edit the data field.

If the data fields are confirmed, the User 101 is then required to take a self-picture/video ("User photo") with the device 103. If the User 101 has elected to enter a self-video, still images from the video are isolated. The system can use a "liveness test" to confirm the User photo is of a live person, who is the User 101. Methods to confirm that an entered image is of a real and/or a live individual are described herein. Any such tests, methods, comparisons, and/or algorithms can be used here. The ID photo and User photo are compared, using for example a biometric routine, and the data is used to calculate the statistical likelihood that the ID photo and the User photo are the same person. If the statistical likelihood is above (greater than) a defined threshold, then there is a Match. For example, the defined threshold can be at least 85% likelihood, in some applications, the defined threshold may be required to be greater than 95%. If the statistical likelihood is below (less than) a defined threshold, then there is a Fail and the User 101 is directed back to the page that generates a digital image of ID.

If there is a Match, the GPS location of the ID Card photo and the GPS location of User photo are compared. If the two GPS locations are substantially the same, then there is a second Match. If the two GPS locations are different, then there is a Fail and the User 101 is directed back to the page that generates a digital image of ID.

After the second Match, the User 101 is requested to enter a set of required personal information/data. In the example of FIG. 4, the set of required personal information/data include entering: the last four digits of ID, an email address, the user name and password, and the phone number of the device 103. However, the set of required personal information/data can be any set of such information/data as provided by an one of the partners 107. The verification app 104 collects the device ID and GPS location. In the example of FIG. 4, the device ID includes the GPS location, the device type, the operating system, the device phone number, and the IMEI number. The User account is then created. The User account then sends out a confirmation email to the User. In some configurations, the User 101 is taken to a dashboard to further set up and/or use the account (which is an optional step). After verification, the account is activated.

Moving to FIG. 5, a flowchart illustrates various privacy settings for the User Profile. The User Profile includes a user name and at least one piece of data from ID, for example, the at least one piece of data comprises at least one of a legal name, an address, a birthdate, a gender, a User photo, and an ID photo. The User Profile can include the device ID. In some configurations, the User 101 is required or allowed to add personal information to the User Profile. For example, the personal information can be, but not limited to: an email address, a social media page, a credit card, a marital status, a military status, a school, and a student number.

As illustrated in FIG. 5, the User 101 can establish the privacy setting to a public profile, which can be the default settings, as well as the privacy setting to one or more specific partners 107. Of course any of the items in the User Profile can be limited by privacy setting, however, one or more of the items in the User Profile maybe required by the partners 107, which cannot be controlled, through the privacy settings. In the example in FIG. 5, the User 101 can control the privacy setting of an exemplary set of items comprising name, date of birth, address, photo, social security number, gender, and criminal record. In this example, the User 101 can control which of these items are viewable by the public or other users. In one example, the User 101 could block date of birth in the public profile but the specific partner 107 requires the date of birth, therefore the User 101 cannot block this item horn the specific partner 107. In some applications, such as, a dating site, the partner 107 may require that the User photo is not blocked by privacy settings. In some configurations, the privacy settings can allow a User 101 to enter social site, which is hosted by a partner 107, anonymously. In some configurations, the privacy settings allow the User 101 to not be tracked when using a partner 107 site or when ordering merchandise or services from a partner 107.

In some applications, the User 101 can set the privacy setting to allow various social networking information or business contact information to be connected to the token. For example, the User 101 can connect Facebook pages, Twitter accounts, blog pages, websites and the like to the token, all of which can be viewed by others (either publicly or limited to certain partners 107) based on the privacy setting chosen by the User 101.

Figure 6:
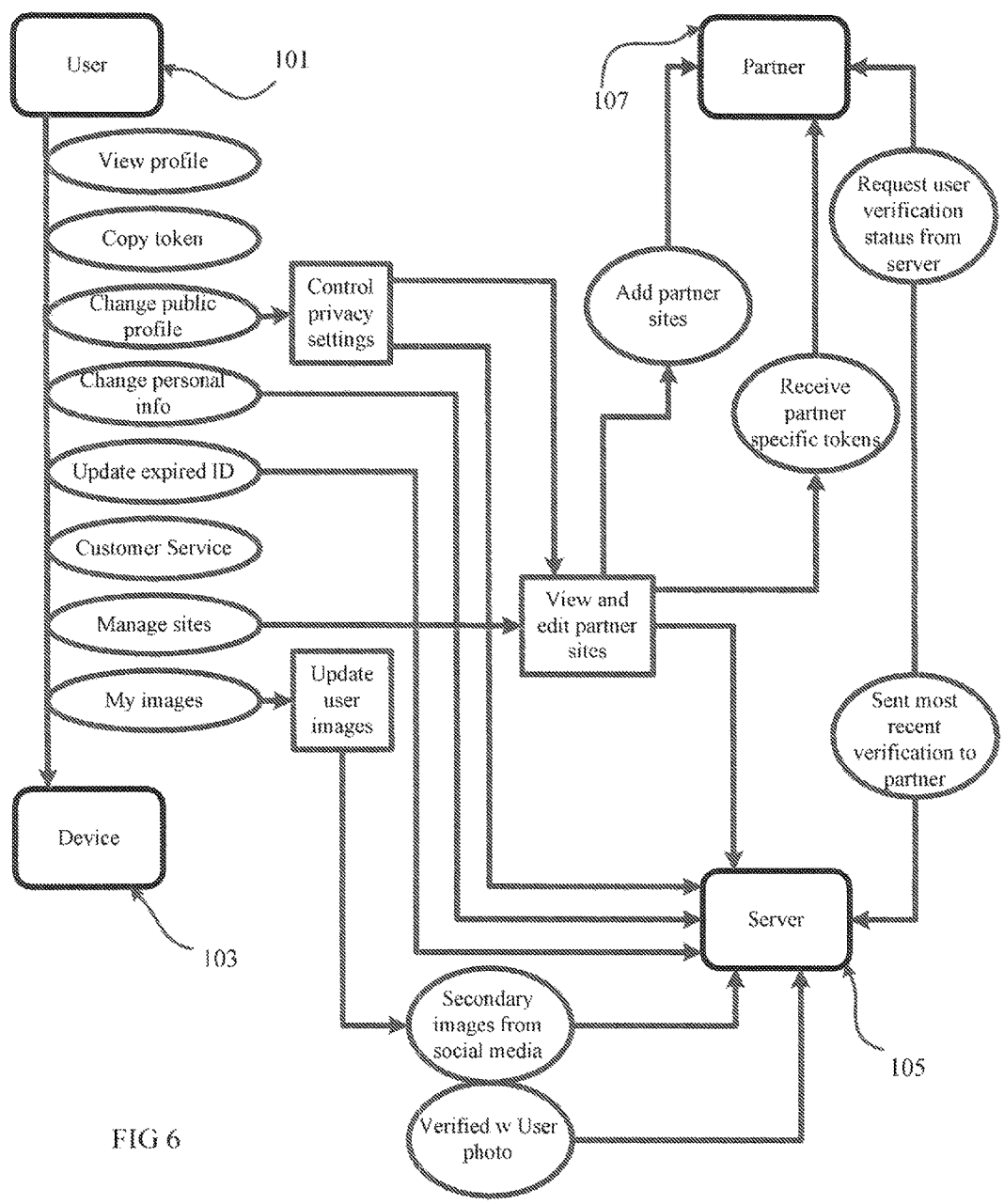
FIG. 6 is a flowchart illustrating an exemplary User process flow of verification and use, in accordance with various embodiments.
Figure 7:
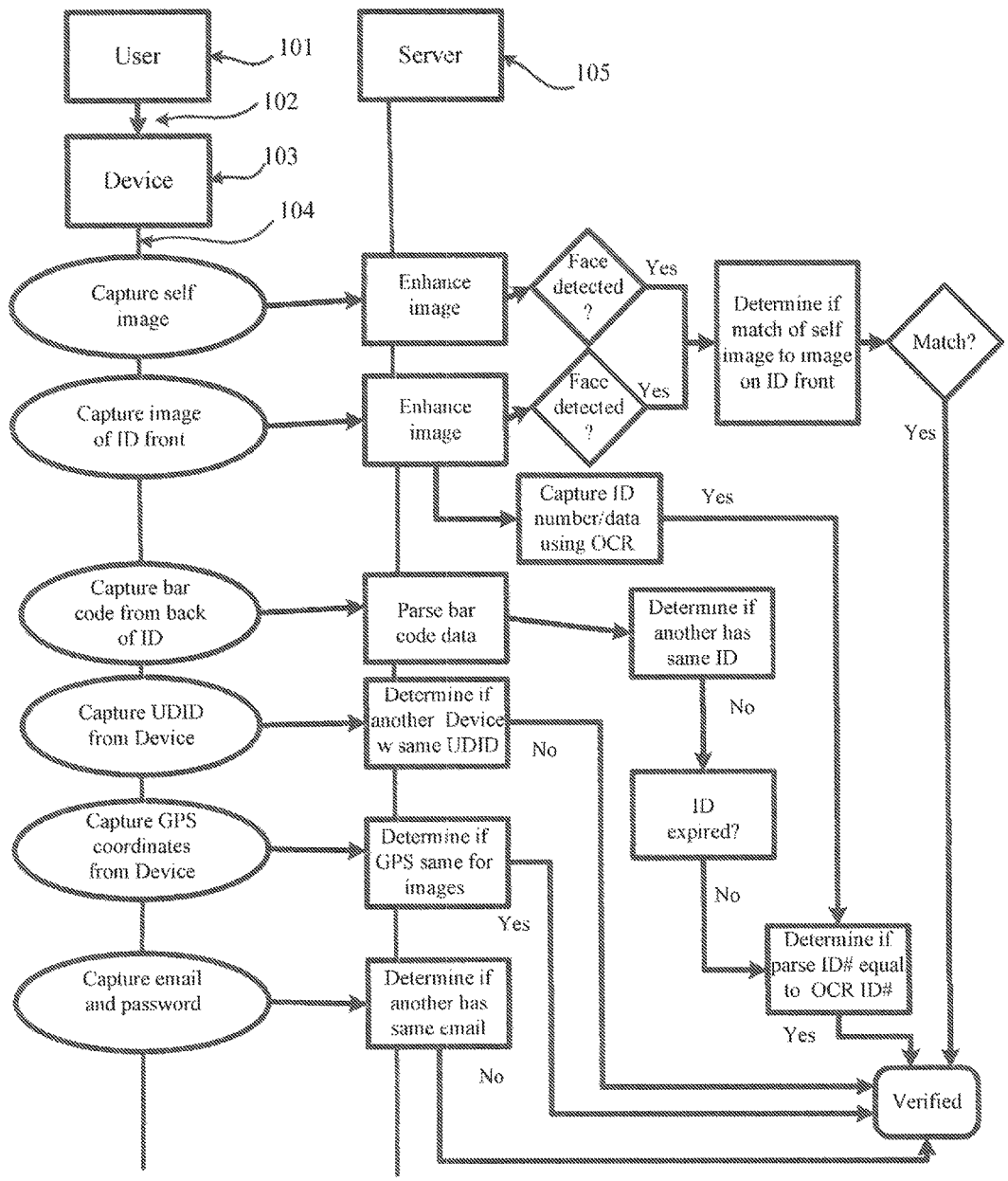
FIG. 7 is a flowchart illustrating an exemplary process flow for providing the online verification methods and systems, in accordance with various embodiments.

FIG. 6 provides a flowchart illustrating an exemplary User process flow of verification and use. The verification app can offer the User 101 a variety of options. For example, the User 101 can view her User Profile. The User 101 can change/Control the privacy setting of the User Profile, which is stored on the server 105. The User 101 can change/update personal information/data, which is stored on the server 105. The User 101 can update an expired ID Card, which is stored on the server 105. The User 101 be in contact with customer serve through the verification app. The User 101 can update User images, which may need to be verified before being stored on the server 105. The User 101 can manage the partner sites 107 that the User 101 has a token to access. The User 101 can update the list of partner sites 107 by deleting a site and/or by applying for access to a different site. A partner 107 can request updated User 101 verification status from the server 105. A partner 107 can request real-time verification from the User 101. The server 105 can provide updates to one or more partners 107, after User 101 has made changes to the User Profile Now turning to FIG. 7, a now chart illustrates a verification method and system. The User 101, by employing the user interface 102, uses the verification app 104, which is installed on the device 103, to perform the various functions. The User 101 uses device 103 to capture a self-image. The self-image can be photo or s series of photos. The self-image can be a short video, from which a set of still images can be isolated. In some embodiments, a "liveness test" can be performed to confirm that the self-image is of a living person, as has been discussed herein. The captured self-image(s) or video is sent to the server 105 for image enhancement and a determination if a face was detected in the self-image(s). The image enhancement can include enhancing stills from a self-image video. The User 101 uses device 103 to capture an image of an ID Card. The image of the ID Card is sent to the server 105 for image enhancement. The image enhancement can include isolating a photo from the ID Card and a determination if a face was detected from the photo. If a face is detected in the self-image and the ID image, then the self-image and the ID image are compared. An algorithm can be used to statistically determine if the self-image and the ID image are a match. If yes, these images are a match, then the first prong of verification has been passed.

The User 101 uses device 103 to capture the bar code from the back of the ID Card. The barcode image is sent to the server 105 and the data from the barcode is parsed and entered into data fields. A determination if someone else has the same ID Card using the data from the barcode. If no, then the ID Card is checked for validity. For example, the ID Card is check for expiration. If no, the ID Card is not expired, the parsed ID number/data from the barcode is compared to the ID number/data captured using OCR from the front of the ID Card. If yes, the ID number from the barcode and the ID number from the front of the ID Card are the same, then the second prong of verification has been passed.

The app 104 captures the UDID from the device 103 and sends the UDID to the server 105. A determination if another device has the same UDID is queried. If no, no other device has the same UDID, and the third prong of verification has been passed.

The app 104 captures the GPS coordinates from the self-image and the GPS coordinates of the image of the front of the ID Card then sends the two sets of the GPS coordinates to the server 105. If the two sets of GPS coordinates are substantially the same, then the fourth prong of the verification has been passed. In some embodiments, the app 104 captures the GPS coordinates from the self-image, the GPS coordinates of the image of the front of the ID Card, and the GPS coordinates of the image of the barcode, then sends all three sets of the GPS coordinates to the server 105. If all three sets of GPS coordinates are substantially the same, then the fourth prong of the verification has been passed.

The User 101 enters an email address and a password into the app 104 on the device 103. The email address is sent to the server 105 and checked to determine if another person has the same email address. If no, then the fifth prong of the verification has been passed.

If all five prongs of the verification have been passed, then the User 101 has been verified. Once verified, the User can have a token (or access key) added to the device 103, which allows the User 101 access to various partners 107, as discussed herein. Once verified the server 105 can send a partner 107 a token with allows User to access that partner's site and/or services. Secondary verification can be used to confirm User is accessing a partner 107 with device 103, which have been verified.

Additional prongs, which are similar to the email verification, can be included in a verification process. For example, the User may be prompted by the app 104 to enter a SSN. The SSN, which was entered, is forwarded to the server 105 can checked against a database to determine if another person is using the same SSN. If yes, then this prong of the verification is not passed and the User 101 cannot be verified. Similarly, the User may be prompted to enter credit card information, which is reviewed in the same way. In another example, the User may be prompted to enter his/her zip code of residence, which can be run against a database of mailing addresses. As obvious to one skilled in the art, any combination of personal data can be used in an additional prong for verification. Additional tests or prongs for verification can be added to any of the embodiments described herein and variations thereof.

All prongs for verification must be passed for a User 101 to be verified. In the example illustrated in FIG. 7, five prongs for verification must be passed for a User to be verified. If a User does not pass one of the prongs for verification, a manual review of the User's data can be commenced to determine if the User is the person claimed to be. This manual review can use the standards for a notary public to verify the User. In some configurations, the manual review can be initiated by the User 101. In some configuration, the manual review can be automatically initiated by the system. In an example of the manual review, a User 101 enters his/her SSN and it is determined that someone else is also using this SSN. The manual review can use additional information connected to the SSN in the database to override the SSN failure and verify the User 101. The manual review can use additional information for other sources to determine the identity of the User 101 and override the SSN failure then verify the User 101. Variations of the manual review can be added to any of the embodiments described herein and variations thereof.

Figure 8:
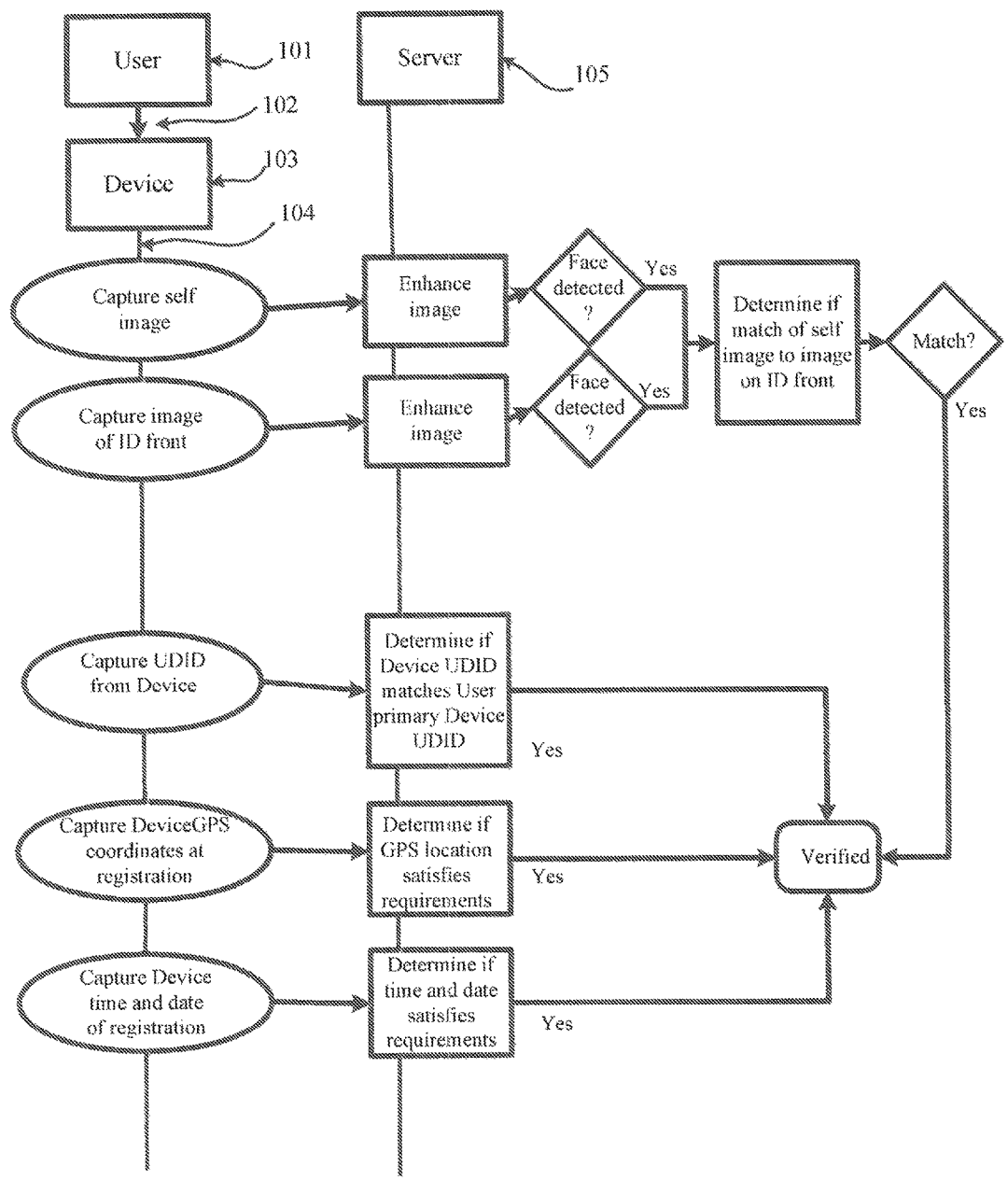
FIG. 8 is a flowchart illustrating an exemplary process flow for providing the online verification methods and systems, in accordance with various embodiments.

With reference to FIG. 8, a flow chart illustrates a verification method and system. The User 101, by employing the user interface 102, uses the verification app 104, which is installed on the device 103, to perform the various functions. The User 101 uses device 103 to capture a self-image. The self-image can be photo or s series of photos. The self-image can be a short video, from which a set of still images can be isolated. In some embodiments, aliveness test can be performed to confirm that the self-image is of a living person, as has been discussed herein. The captured self image(s) or video is sent to the server 105 for image enhancement and a determination if a face was detected in the self-image(s). The image enhancement can include enhancing stills from a self-image video.

The User 101 uses device 103 to capture an image of an ID Card. The image of the ID Card is sent to the server 105 for image enhancement. The image enhancement can include isolating a photo from the ID Card and a determination if a face was detected from the photo. If a face is detected in the self-image and the ID image, then the self-image and the ID image are compared. An algorithm can be used to statistically determine if the self-image and the ID image are a match. If yes, these images are a match, then the first prong of verification has been passed.

The app 104 captures the UDID from the device 103 and sends the UDID to the server 105. A determination if another device has the same UDID is queried. If no, no other device has the same UDID, and the second prong of verification has been passed.

The app 104 captures the GPS coordinates from the self-image and the GPS coordinates of the image of the front of the ID Card then sends the two sets of the GPS coordinates to the server 105. If the two sets of GPS coordinates are substantially the same, then the third prong of the verification has been passed.

The app 104 captures the time and date from the self-image and the time and date of the image of the front of the ID Card then sends the two sets of the time and date to the server 105. If the two sets of time and date are substantially the same, then the fourth prong of the verification has been passed.

If all four prongs of the verification have been passed, then the User 101 has been verified. Once verified, the User can have a token (or access key) added to the device 103, which allows the User 101 access to various partners 107, as discussed herein. Once verified the server 105 can send a partner 107 a token with allows User to access that partner's site and/or services. Secondary verification can be used to confirm User is accessing a partner 107 with device 103, which have been verified.

The methods and systems for verification can be employed in numerous different applications. In one application, the methods and systems can be employed in the financial services industry to secure transactions, for example, credit card transactions. In another application, the methods and systems can be employed for notary public services. In another application, the methods and systems can be employed in on-line testing, which guarantees that the test taker is the person who supposed to take the test.

In another application, the methods and systems can be employed in dating sites. In another application, the methods and systems can be employed in online employment applications. In another application, the methods and systems can be employed in childcare services. In another application, the methods and systems can be employed in secured social networking sites.

In some applications help ensure that the user is above a certain age limit. For example, the methods and systems can be employed in on-line gambling, to ensure that the player is at least 18 years of age. For example, the methods and systems can be employed in on-line alcohol sales, such as, for example, interstate wine sales. In this example, the methods and systems can ensure the buyer of the alcohol is above 21 years old. In another example, the methods and systems can be employed by partners providing content to mature audiences, such as, for example, pornographic content. In this example, the methods and systems can ensure the buyer/user of the content is above 18 years old, or whatever age is statutorily appropriate.

Other applications of the methods and systems can include government agencies, for example, parolee surveillance, tracking sexual predators, prevent IRS fraud, prevent Medicare fraud, and many other examples. An application of the methods and systems can include the use in on-line C-to-Commerce sites and/or on-line B-to Business sites.

The methods and systems can provide a source of data collection for each time a token is used or a user logs in. Other examples of data collection can include the tracking of: when was it used (time/date), device it was used from, device ID it was used from; website/service where it was used; product that it was used for; number of times token was checked/verified by outside users; sites on which those verifications took place; products for which those verifications took place; device from which those verifications took place; and demographic information on users that verified an ID.

As used herein, the phrase "at least one of A, B, and C" can be construed to mean a logical (A or B or C), using a non-exclusive logical "or," however, can be contrasted to mean (A, B, and C), in addition, can be construed to mean (A and B) or (A and C) or (B and C). As used herein, the phrase "A, B and/or C" should be construed to mean (A, B, and C) or alternatively (A or B or C), using a non-exclusive logical "or."

The present invention has been described above with reference to various exemplary embodiments and examples, which are not intended to be limiting in describing the fall scope of systems and methods of this invention. However, those skilled in the art will recognize that equivalent changes, modifications and variations of the embodiments, materials, systems, and methods may be made within the scope of the present invention, with substantially similar results, and are intended to be included within the scope of the present invention, as set forth in the following claims.

The invention claimed is:

1. A method for providing a secured system, comprising;
generating an image of a face of a user at first location with a device comprising a clock and a GPS;
tagging the image with GPS coordinates of the first location;
tagging the image with a time and a date of the generating of the image;
generating an image of an identification card comprising a picture of the user at a second location;
tagging the image of the identification card with GPS coordinates of the second location;
tagging the image of the identification card with a time and date of the generating of the image of the identification card;
comparing the image of the face and the image of the picture of the user;
determining the likelihood that the image of the face and the image of the picture of the user are substantially the same;
determining if the GPS coordinates of the first location and the GPS coordinates of the second location are substantially the same;
determining if the time and date of the generating the image of the face and the time and date of the generating the image of the identification card are within a defined time window;
retrieving device identification data from the device;
tagging the image with the device identification data of the device generating the image of the face;
tagging the image of the identification card with the device identification data of the device generating the image of the identification card;
determining if the device identification data of the device generating the image of the face and the device identification data of the device generating the image of the identification card are the same; and
generating an authorization key, if the image of the face and the image of the picture of the user are substantially the same, if the GPS coordinates of the first location and the GPS coordinates of the second location are substantially the same, if the time and date of the generating the image of the face and the time and date of the generating the image of the identification card are within the defined time window, and if the device identification data of the device generating the image of face and the device identification data of the device generating the image of the identification card are the same.

2. The method according to claim 1, wherein the authorization key is a token configured to allow the user to access a secured website.

3. The method according to claim 1, further comprising collecting data comprising at least one of a name, an address, a birthdate, and a gender from the image of the identification card and connecting the data to a user profile.

4. The method according to claim 3, wherein the data further comprises at least one of an identification card type, an identification card number, an identification card issue date, an identification card expiration date, and an identification card issuing agency.

5. The method according to claim 3, further comprising the steps of:
   comparing the data to a database;
   determining if the database identifies a defined null value; and
   preventing the generating the authorization key if the null value is identified.

6. The method according to claim 5, wherein the database comprises a sex offender registry and the defined null value is a sexual predator.

7. The method according to claim 5, wherein the database comprises a criminal history and the defined null value is a criminal conviction.

8. The method according to claim 5, wherein the database comprises a credit history and the defined null value is a credit score below a defined value.

9. The method according to claim 5, comprising denying an authorization key if an age as calculated by the birthdate is below a defined age threshold.

10. The method according to claim 1, further comprising the steps of:
    scanning the image of the identification card for a hologram;
    comparing the hologram to a standard from a database;
    determining if the identification card is fraudulent; and
    preventing the generating of the authorization key if the identification card is fraudulent.

11. The method according to claim 1, further comprising:
    receiving and storing an initial secondary identifier after the generating the authorization key;
    requesting user to input a secondary identifier at a later time;
    receiving the secondary identifier from the user;
    comparing the secondary identifier to the initial secondary identifier;
    determining if the secondary identifier and the initial secondary identifier are substantially the same; and
    renew the authorization key if the secondary identifier and the initial secondary identifier are substantially the same.

12. The method according to claim 11, wherein the secondary identifier is one of:
    a voice pattern generated by the user and captured by a microphone on the device;
    an image of a retina of a user's eye captured by the device;
    at least one fingerprint of the user captured by the device;
    a palm scan of the user captured by the device;
    a photo of the user captured by the device;
    a RFID tag tethered to the device; and
    a password.

13. A system for secured transactions over a network, the system comprising:
    an app downloadable to a device comprising a camera, a GPS locator, a network interface, and a user interface, the app comprises:
      a process to initiate a user to take and capture a picture of a user's face with the camera;
      a process to capture a first set of GPS coordinates, a first time and date of the picture of the user's face;
      a process to initiate the user to take and capture a picture of an identification card with the camera;
      a process to capture a second set of GPS coordinates, a second time and date of the picture of the identification card;
      a process to capture identification data of the device;
      a process to send data comprising at least one of the picture of the user's face, the picture of the identification card, the first set of GPS coordinates, the second set of GPS coordinates, the first time and date of the picture of the user's face, the second time and date of the picture of the identification card, and the identification data to a location on the network; and
      a process to receive and communicate information;
    a verification engine on a server at the location on the network, the verification engine comprising:
      an input configured to receive the data from the app;
      an image comparison algorithm configured to compare the picture of the user's face, the picture of the identification card, then determine the likelihood that the user and a person in the picture of the identification card are substantially the same;
      a location comparison algorithm configured to determine if the first set of GPS coordinates and the second set of GPS coordinates are substantially the same; and
      a time comparison algorithm configured to determine if the first time and date of the picture of the user's face, the second time and date of the picture of the identification card are substantially the same; and
    a verification token configured to allow the user access to at least one restricted site, the verification token configured to be sent to the app if the user and a person in the picture of the identification card are substantially the same, if the first set of GPS coordinates and the second set of GPS coordinates are substantially the same, and if the first time and date of the picture of the user's face, the second time and date of the picture of the identification card are substantially the same; and
    a secondary verification system configured to:
      receive and store an initial secondary identifier at a first time;
      receive a second secondary identifier at a second time;
      compare the second secondary identifier to the initial secondary identifier;
      determine if the second secondary identifier and the initial secondary identifier are substantially the same; and
      renew the verification token if the second secondary identifier and the initial secondary identifier are substantially the same.

14. The system according to claim 13, further comprising a not verified message configured to be sent to the app if at least one of an outcome of the image comparison algorithm is negative, or if an outcome of the location comparison algorithm is negative, or if an outcome of the time comparison is negative.

15. The system according to claim 13, wherein the secondary identifier is at least one of: an image of a retina of a user's eye captured by the camera; at least one fingerprint of the user captured by the device; and a voice pattern generated by the user and captured by a microphone on the device.

16. The system according to claim 13, further comprising a user profile comprising a user name and at least one piece of data from the identification card, wherein the at least one piece of data comprises at least one of a legal name, an address, a birthdate, a gender and a picture of the user.

17. The system according to claim 16, wherein the verification engine is configured to collect text from the identification card, convert the text into the at least one piece of data and enter the at least one piece of data into the user profile.

18. The system according to claim 16, wherein the user profile is configured to allow the user to add personal information, wherein the personal information comprises at least one of an email address, a social media page, a credit card, a marital status, a military status, a school, and a student number.

19. The system according to claim 16, further comprising a privacy setting configurable by the user and controlling which items in the user profile are viewable by other users.

\* \* \* \* \*